(12) United States Patent
Bacco et al.

(10) Patent No.: US 7,693,758 B1
(45) Date of Patent: Apr. 6, 2010

(54) ACTIVITY VERIFICATION

(75) Inventors: Edward M. Bacco, Bainbridge Island, WA (US); David K. Hiatt, Woodinville, WA (US)

(73) Assignee: Amazon Technologies, Inc., Reno, NV (US)

( * ) Notice: Subject to any disclaimer, the term of this patent is extended or adjusted under 35 U.S.C. 154(b) by 144 days.

(21) Appl. No.: 11/762,621

(22) Filed: Jun. 13, 2007

(51) Int. Cl.
*G06Q 10/10* (2006.01)
*G07G 1/00* (2006.01)
*H04N 6/30* (2006.01)
*G06F 21/00* (2006.01)

(52) U.S. Cl. ............................ 705/28; 700/99; 348/143; 713/186

(58) Field of Classification Search ............... 705/28; 700/99
See application file for complete search history.

(56) References Cited

U.S. PATENT DOCUMENTS 6,816,746 B2 * 11/2004 Bickley et al. ............... 700/99
2006/0173756 A1 * 8/2006 Benight ....................... 705/28

* cited by examiner

*Primary Examiner*—F. Zeender
*Assistant Examiner*—Denisse Ortiz Roman
(74) *Attorney, Agent, or Firm*—Thomas, Kayden, Horstemeyer & Risley, LLP

(57) ABSTRACT

Disclosed are various embodiments of systems, methods, and computer programs that facilitate verification of activity in an environment of predefined activity orchestration. Activity is captured on image capture devices in the environment of predefined activity orchestration. The activity is verified to be consistent with the predefined activity orchestration. An event is generated based upon whether the activity is consistent with the predefined activity orchestration.

37 Claims, 6 Drawing Sheets

ACTIVITY VERIFICATION

BACKGROUND

Maintenance of inventory in materials handling facilities, such as product distribution or fulfillment centers, can be complicated due to various factors resulting in so-called "inventory shrinkage." Inventory shrinkage refers to an amount of inventory of products in a materials handling facility that is lost each year due to various factors, such as theft, misplaced items, inaccurate selection of items, damage, and other factors. The amount of lost inventory over a given period of time is typically referred to as "shrinkage rate." The shrinkage rate associated with inventory of a given organization can vary depending upon the specific environment. A typical shrinkage rate for an average company might be approximately 1% of inventory sales, which translates into millions, if not billions of dollars of lost inventory each year.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figure 1:
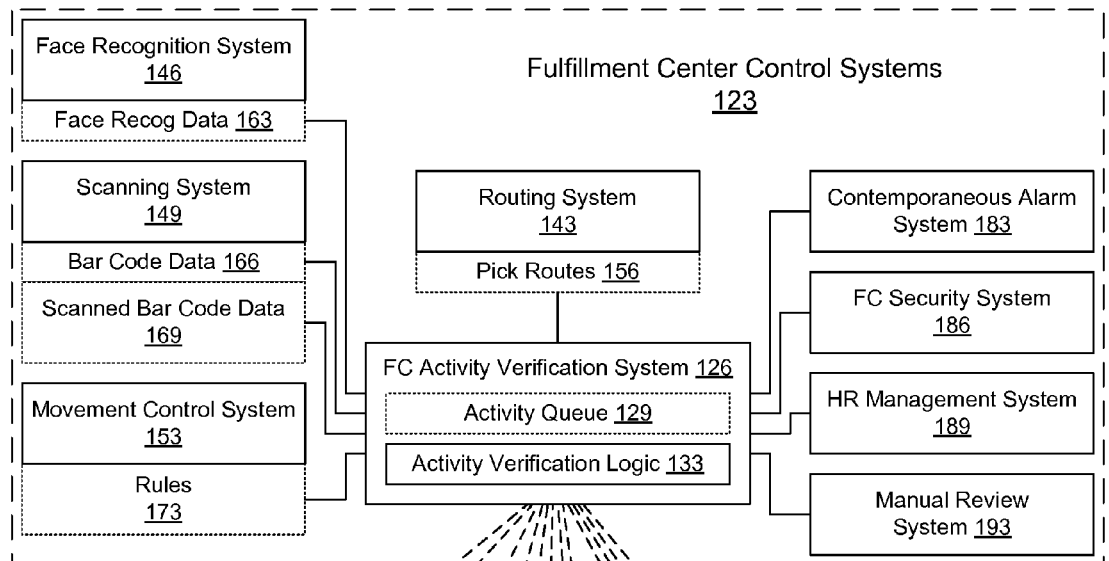
FIG. 1 is a drawing of one example of an environment of predefined activity orchestration that includes a system to verify activity occurring in the environment according to an embodiment of the present invention.
Figure 1:
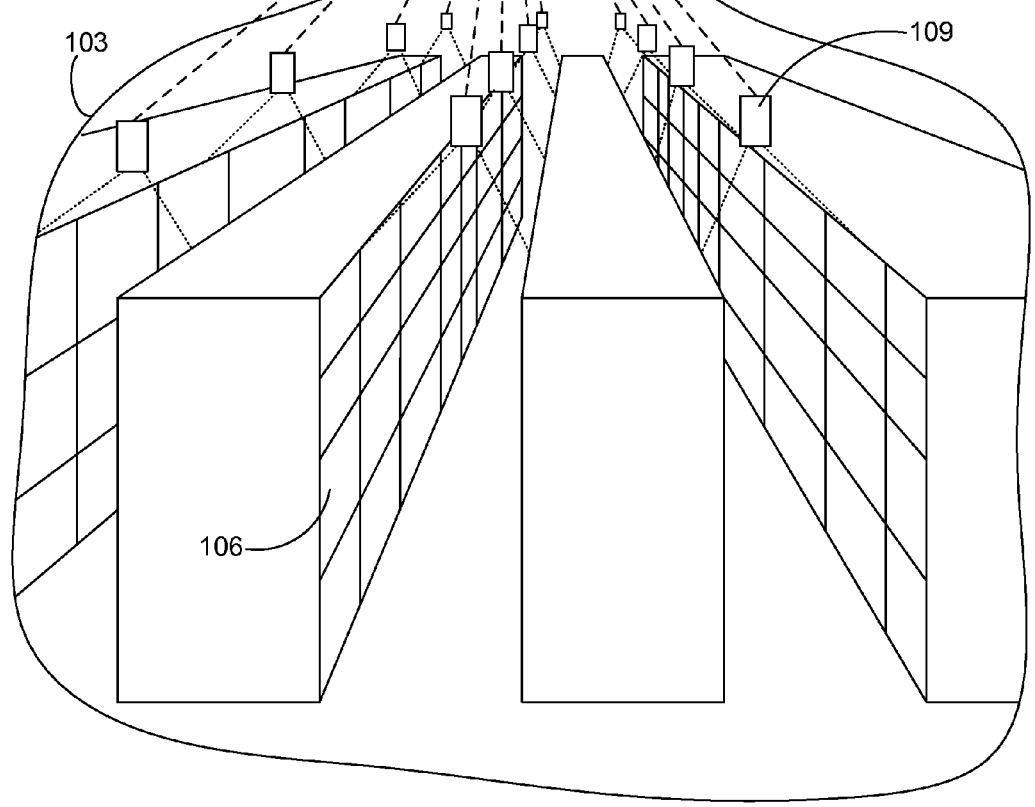

With reference to FIG. 1, shown is a drawing of an environment 103 such as, for example, a portion of a materials handling facility. Materials handling facilities may include one or more of, but are not limited to, warehouses, distribution centers, cross-docking facilities, order fulfillment centers (also referred to as fulfillment facilities), packaging facilities, shipping facilities, or other facilities or combination of facilities for performing one or more functions of material (inventory) handling. Although the environment 103 is described herein with specific reference to a materials handling facility and specifically a fulfillment center, it is understood that a materials handling facility provides one example of many other types of environments to which the principles described herein apply. For example, the environment 103 might be a factory, a prison, a school, a park, or other establishment.

According to the illustration provided herein, the environment 103 may comprise, for example, a large warehouse or other structure that includes a plurality of inventory locations 106, such as bins, slots, containers, receptacles, etc. An inventory of items is stored in the inventory locations 106 as can be appreciated. Where the environment 103 comprises a fulfillment center, agents, or "pickers," within the environment 103 perform the role of fulfilling orders for items purchased by customers. Specifically, agents perform the task of gathering, storing, or sorting items from inventory locations 106 in the environment 103 to fulfill orders for goods that are shipped to the customers.

Included within the environment are one or more image capture devices 109 according to an embodiment of the present invention. The image capture devices 109 may comprise, for example, digital still cameras that take multiple images of their field of view, or video cameras that generate video of activity that occurs within their field of view. The image capture devices 109 are located at stationary points in the environment 103 so as to facilitate monitoring of activity that occurs within the environment 103, given that at least some or all of the activity within the environment 103 is orchestrated according to the predefined activity orchestration associated with the environment 103. The environment 103 may be a vast facility that includes numerous inventory locations 106 for the storage of a large variety of different items. There may also be multiple image capture devices 109 located throughout the environment 103. The image capture devices 109 may be positioned so as to have various inventory locations 106 within their field of view. Also, the image capture devices 109 may be positioned in some other manner to capture images of various portions of the environment 103. The images captured by the image capture devices 109 may comprise still images or video images that depict various activities occurring in the environment 103.

Still further, in other embodiments, the image capture devices 109 may be mobile rather than stationary. For example, the image capture devices 109 may move along a track, pivot about one or more axes, or may move in some other manner. Also, the image capture devices 109 may be attached to roving equipment that traverses through the environment 103. Where image capture devices 109 are moveable, a control system may be employed to keep track the location of the field of view relative to or within the environment 103. Alternatively, the environment 103 may include markers that appear in the field of view of image capture devices 109 that may be used to determine where the field of view of the image capture devices 109 lies at any given time. Also, the image capture devices 109 may include a lens that provides for zooming and automated focus.

Associated with the environment 103 are one or more control systems 123 according to an embodiment of the invention. The control systems 123 include various systems that are implemented to perform various functions relative to the operation of the materials handling facility such as order fulfillment, inventory control, human resources, and other systems. Where the environment 103 comprises a fulfillment center, the various control systems 123 may generate or store information that ultimately sets forth the predefined activity orchestration associated with the environment 103, as will be discussed. The predefined activity orchestration in this sense refers to the control or scripting of the activity of agents and other individuals within the environment 103 to achieve a desired overall result within the environment 103.

Among the control systems 123 is a fulfillment center (FC) activity verification system 126. The FC activity verification system 126 includes an activity queue 129 and activity verification logic 133 according to various embodiments of the present invention. The FC activity verification system 126 is executable to verify whether an activity captured by at least one of the image capture devices 109 in the environment 103 is consistent with the predefined activity orchestration of the environment 103. The activity queue 129 is provided, for example, for temporary storage of messages, images, or other data representing activity received from the image capture devices 109 to be verified by the FC activity verification system 126.

The FC activity verification system 126 consults with various systems that provide for the predefined activity orchestration of the environment 103. In the context of a fulfillment center, such systems may include, for example, a routing system 143, a face recognition system 146, an inventory control system 149, a movement control system 153, or other systems.

The routing system 143 generates information that provides for at least some of the predefined activity orchestration of the environment 103. Specifically, the routing system 143 receives the orders for goods from customers and generates pick routes 156 that are used by agents to obtain items for shipping to customers. Each of the pick routes 156 includes a list of items associated with one or more customer orders. Also, each of the pick routes 156 includes a list of the inventory locations 106 in which the items that are subject to the order(s) are located within the environment 103. Each of the pick routes 156 further includes a route that an agent is to follow in gathering the respective items listed in the pick route 156 from the inventory locations 106 to be shipped to customers for order fulfillment.

The pick routes 156 present predefined activity orchestration associated with the environment 103 in that the pick routes 156 identify specific ones of the inventory locations 106 that are to be accessed, as well as the routes the agents are to follow in gathering items from the inventory locations 106. The routing system 143 optimizes the pick routes 156 followed by the agents, so as to minimize the time it takes agents to traverse through the environment 103 to increase the efficiency in gathering items from the inventory locations 106 to fulfill various orders.

The face recognition system 146 includes face recognition data 163 that is gathered from individuals, such as agents, that are employed or are otherwise expected to be in the environment 103. Specifically, facial image data of the individuals who are expected to work or otherwise exist in the environment 103 may be obtained and stored for future comparison with images taken of individuals while they make their way through the environment 103. For example, where the environment 103 is a fulfillment center, for example, an image of an individual may be captured while they are on a pick route 156 or performing some other function such as sweeping the floor, performing maintenance, providing a tour to outside individuals, performing inspections, and other purpose.

The face recognition system 146 typically receives an image of a face from the FC activity verification system 126 that was generated by one of the image capture devices 109 for verification. The face recognition system 146 may then perform various analysis and comparisons between the face recognition data 163 and the image of the face obtained from the FC activity verification system 126 to determine the identity of the individual depicted in the captured image. Once the individual is identified, the face recognition system 146 returns the identity of the individual back to the FC activity verification system 126 to take further action as is deemed necessary, as will be described.

The inventory control system 149 is used as a tool for inventory control within the environment 103. In order to track inventory, the inventory control system 149 may interface with portable or fixed bar code scanning equipment used in the environment 103. For example, the inventory control system 149 may interface with RF-connected wireless terminals, handheld scanners, or stationary scanners throughout the environment 103. The inventory control system 149 may include bar code data 166 that comprises, for example, a bar code for each item or line of items stored within the various inventory locations 106 of the environment 103. The bar code data facilitates tracking of all the various items making up an inventory stored in the environment 103. The inventory control system 149 also includes scanned bar code data 169.

The scanned bar code data 169 is data obtained from items scanned, for example, by agents using portable scanners in the environment 103. Also, the same agents may scan bar codes associated with the inventory locations 106 that are accessed. For example, when an agent wishes to take an item out of an inventory location 106, the agent may employ a handheld scanner to scan a bar code associated with the item, as well as a bar code associated with the inventory location 106. The scanned bar codes are transmitted back to the inventory control system 149 to confirm that the appropriate item from the appropriate location has been selected by the agent. The inventory control system 149 can track the amount of items currently contained within each inventory location 106 based on the scanned bar code data 169 and the bar code data 166.

Also, when items are stocked into the inventory locations 106, a stocker may scan the items and the inventory location 106 into which the items are placed, thereby allowing the inventory control system 149 to track items that are placed into the inventory locations 106. Given that the scanned bar code data 169 provides an indication as to when items are removed or placed into inventory locations 106, the scanned bar code data 169 sets forth predefined activity orchestration that may be accessed to verify various activities occurring within the environment 103. In this sense, the scanned bar code data 169 indicates when items have been removed or added to inventory locations 106.

The movement control system 153 includes a number of rules 173 that relate to how activity is to occur within the environment 103. In particular, the rules 173 may mandate how equipment is to be used, the speed at which equipment is moved, and other conditions that should be adhered to for safety purposes or other purposes within the environment 103. The movement control system 153 may comprise, for example, a system that facilitates inputting the rules 173 that are viewed as predefined activity orchestration associated with the environment 103.

Also among the control systems 123 are various systems with which the FC activity verification system 126 interfaces to take action, for example, based upon an event generated, for example, due to the detection of activity captured by one or more of the image capture devices that is inconsistent with the predefined activity orchestration of the environment 103. These systems include, but are not limited to, a contemporaneous alarm system 183, a security system 186, a human resources management system 189, a manual review system 193, or other systems. Alternatively, the functionality of two or more of these systems may be integrated together in a single system. To this end, it should be understood that these systems are cited here in order to describe example functionality associated with such systems. The various actions that may be implemented by these systems are generally implemented in response to events generated by the FC activity verification system 126. The actions may include action to ameliorate any negative consequence that might occur due to activity captured by the image capture devices 109, where the activity is inconsistent with the predefined activity orchestration of the environment 103.

The contemporaneous alarm system 183 can initiate various alarms within the environment 103 when the FC activity verification system 126 cannot verify that a given activity captured by one or more of the image capture devices 109 is consistent with the predefined activity orchestration associated with the environment 103. The FC activity verification system 126 is configured to generate an event indicating, for example, that an activity is inconsistent with the predefined activity orchestration of the environment 103. Events may be received by the various systems, such as the alarm system 183 and used to generate an appropriate contemporaneous action, such as setting off an alarm near the location of the activity in the environment 103 as will be described. To this end, the contemporaneous alarm system 183 may include various alarms such as audible alarms, visual alarms, or other types of alarms that are positioned throughout the environment 103. For example, the contemporaneous alarm system 183 may activate a flashing light at a location where an activity has been detected that is inconsistent with the predefined activity orchestration of the environment 103. Alternatively, the contemporaneous alarm system 183 may transmit messages or generate an audible alarm using speakers that are placed strategically throughout the environment 103. The messages or other sound may inform to individuals that an activity was performed that was inconsistent with the predefined activity orchestration of the environment 103. Also, individuals such as agents may carry equipment such as scanners or pagers over which warning messages may be sent. The alarms generated may be contemporaneous with the activity that is captured by one or more of the image capture devices 109. In this sense, an alarm is contemporaneous with the activity in that it is triggered shortly after the activity occurs and/or at the location of the individual so that timely action or corrective action may be taken before the individual moves on. For example, the alarms can prompt agents or other individuals to correct what might be a problem due to the activity performed such as, for example, taking an item from the wrong inventory location 106, or placing an item in a wrong inventory location 106, thereby potentially resulting in lost inventory.

The security system 186 involves functionality that allows security personnel to perform their duties. Such functionality may involve presenting images from various cameras for monitoring purposes and systems that track access by individuals to the environment 103, etc. The FC activity verification system 126 may generate events that are sent to the security system 186 that include images of activity captured by image capture devices 109 that is judged to be inconsistent with the predefined activity orchestration of the environment 103. For example, if an agent takes an item out of an inventory location 106 and yet there is no pick route 156 that requires such inventory location 106 to be accessed, or no scanned bar codes 169 were received associated with the item taken or associated with the accessed inventory location 106, then such image may be sent to the security system 196 to be presented to security personnel as it is quite possible that the picker is attempting to steal the item. In response to the event received from the FC activity verification system 126, the security system 186 may be triggered to implement such action as presenting the images of the activity to security personnel or take other action.

The human resources management system 189 is a system that facilitates, for example, management of human resource issues on the part of management personnel associated with the environment 103. For example, the human resources management system 189 may facilitate the creation of records associated with employees as well as a record of incidents that occur in the environment 103 involving such employees. The FC activity verification system 126 may generate an event that triggers the human resources management system 189 to implement various actions. For example, in some cases the FC activity verification system 126 may find it is unable to verify an activity captured by an image capture device 109 with respect to a given employee as consistent with the predefined activity orchestration of the environment 103. The FC activity verification system 126 generates an event indicating the inconsistency of the activity and provides the event to the human resources management system 189. The event triggers the human resources management system 189 to take appropriate action such as, for example, rendering a message to alert managers as to the potential problem. Such an alert might be for activities that relate to human resource management but do not need to involve security personnel associated with the environment 103. For example, the event generated might indicate that an agent was detected as passing through a checkpoint in the environment 103 that was not consistent with a pick route 156, thereby requiring management personnel to discuss the issue with the agent as is appropriate.

The manual review system 193 provides a location for the storage of images of activities captured by the image capture devices 109 that cannot be verified by the FC activity verification system 126. In such case, the FC activity verification system 126 generates an event indicating that the activity could not be verified. In response to such an event, the manual review system 193 stores the captured images to be presented to management personnel for manual review and verification. In this respect, the manual review system 193 takes into account that the FC activity verification system 126 might not be able to process and properly draw a conclusion about all of the images of activity captured by the image capture devices 109. However, due to the fact that the FC activity verification system 126 can draw conclusions about many, if not most, of the images of activity generated by the image capture devices 109, the number of images that require manual review are minimized, thereby reducing cost.

Figure 2:
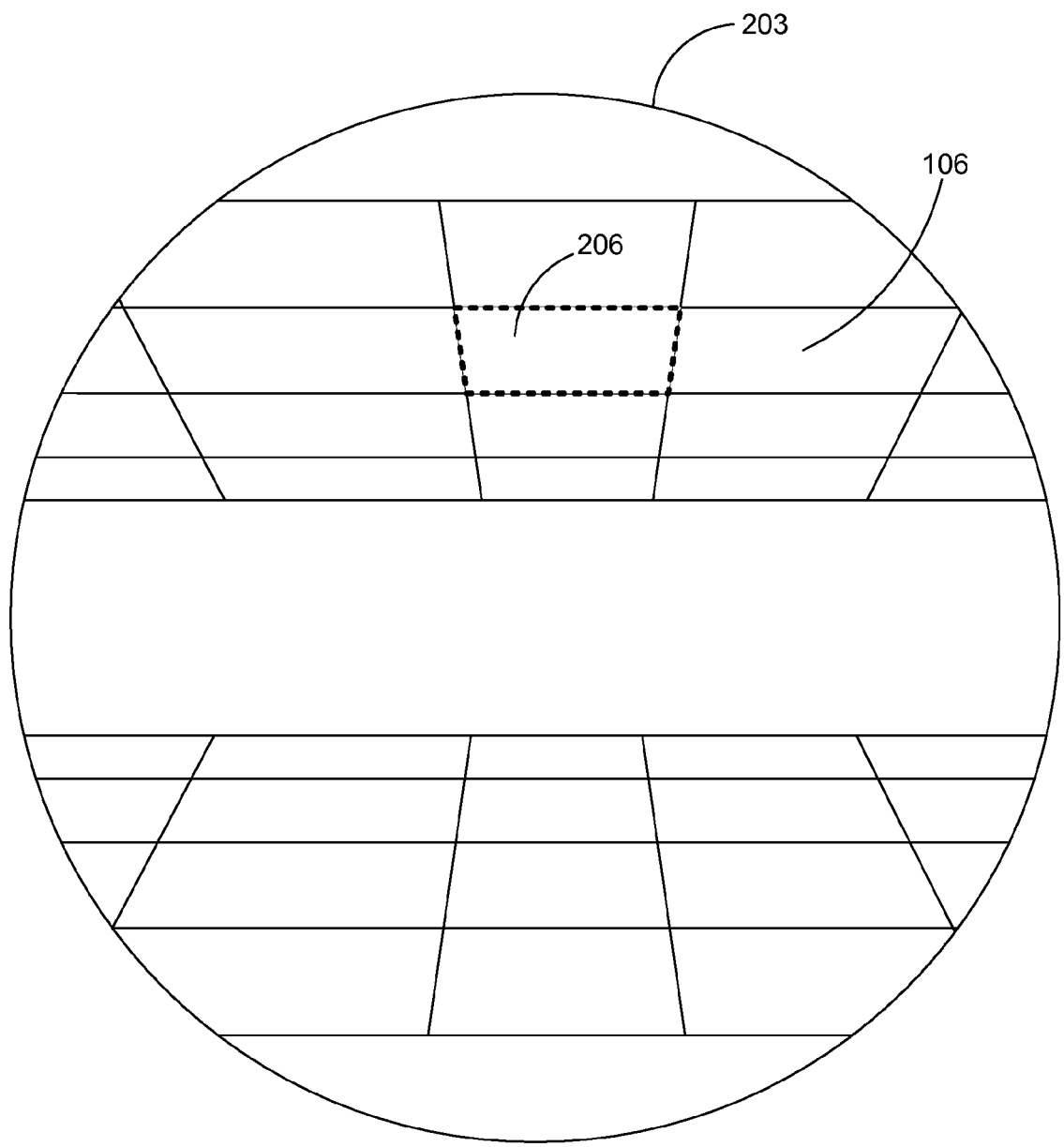
FIG. 2 is a drawing of one example of a field of view of an image capture device in the environment of FIG. 1 according to an embodiment of the present invention.

Referring next to FIG. 2, shown is a field of view 203 of one of the image capture devices 109 (FIG. 1) according to an embodiment of the present invention. As shown, the field of view 203 includes a number of inventory locations 106 as they appear with the image capture device 109 facing in a downward direction as depicted with respect to FIG. 1. Alternatively, the image capture devices 109 may be positioned in any orientation with a corresponding field of view 203 that may include views of the inventory locations 106 or other structures included within the environment 103 (FIG. 1).

The images of the field of view 203 are represented by a number of pixels of the image capture device 109 as can be appreciated. In this respect, areas of pixels 206 that are associated with respective ones of the inventory locations 106 can be determined and associated with those inventory locations 106. Each inventory location 106 or other structure of the environment 103 may include a dedicated area of pixels 206 from one of the image capture devices 109 such that activity occurring with respect to such inventory location may be detected. Such activity may be, for example, removing an item from or adding an item to the inventory location 106, etc. Alternatively, areas of pixels in a given field of view 203 of an image capture device 109 may also be associated with areas that do not include inventory locations 106, such as an aisle, door, or other structure.

Due to the fact that each of the image capture devices 109 is mounted in a fixed location within the environment 103, each image capture device 109 can generate and transmit images of the specific location to the FC activity verification system 126. The FC activity verification system 126 may then verify whether the activity depicted in the images is consistent with the predefined activity orchestration of the environment 103. Alternatively, rather than sending actual images, the image capture devices 109 may be configured to generate an output associated with activity that occurs in a known area of pixels 206 and such output may be supplied to the FC activity verification system 126. Thus, the image capture devices 109 may provide information with respect to activity that occurs in known locations anywhere in the environment 103, provided that the location of the activity falls within the field of view 203 of at least one of the image capture devices 109.

Given that the physical location of the activity captured is known, action may then be taken that is localized to such a location. For example, if an item has been picked from a wrong inventory location 106 by mistake, a flashing light or audible alarm might be triggered in the location of the error so that the agent can reassess their action to ensure that proper items are shipped to customers according to the pick routes 156. Thus, action may be taken in response to the fact that certain activity is detected that was inconsistent with the predefined activity orchestration of the environment 103. Also, the action may be taken contemporaneously with respect to the activity itself to correct any potential error in an expeditious manner.

Figure 3A:
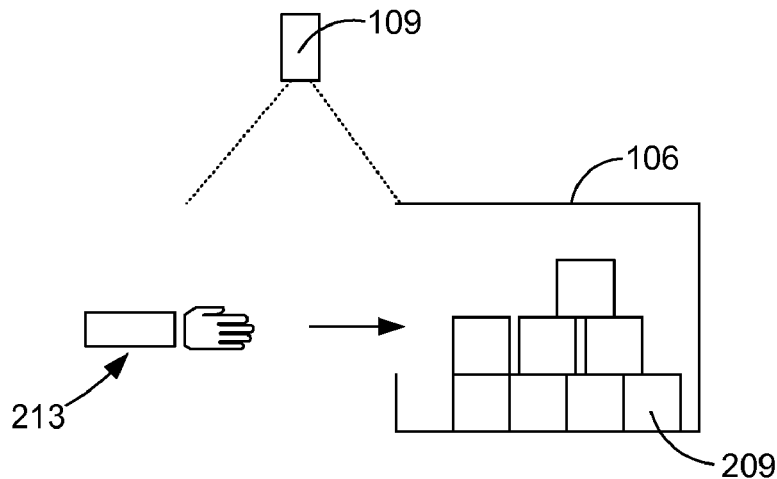
FIGS. 3A, 3B, and 3C are drawings depicting examples of activity occurring in the environment of FIG. 1 according to an embodiment of the present invention.
Figure 3B:
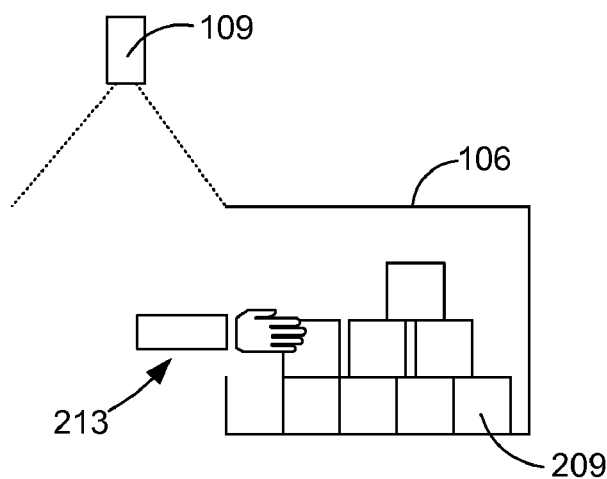
Figure 3C:
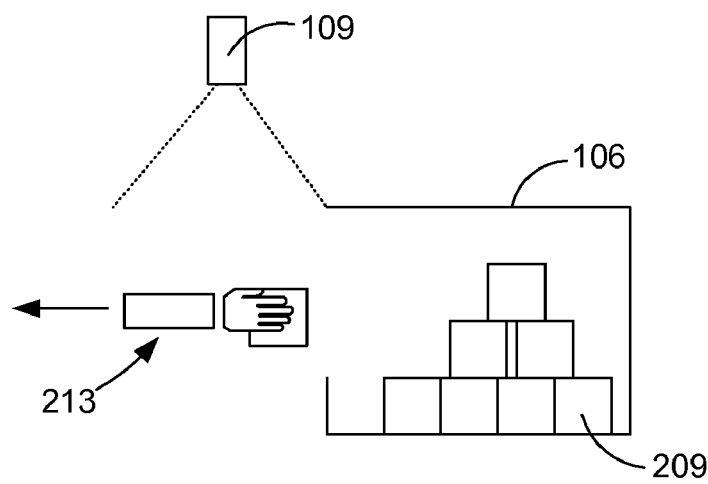

Referring next to FIGS. 3A, 3B, and 3C, shown are views of an activity that may be captured by an image capture device 109 according to an embodiment of the present invention. In particular, an image capture device 109 is positioned relative to an inventory location 106 such that the opening of the inventory location 106 falls within the field of view 203 (FIG. 2) of the image capture device 109. An agent 213 wishes to obtain an item 209 from those held in the inventory location 106. The image capture device 109 may capture images before the agent 213 accesses the inventory location 106 that show an open face of the inventory location 106 without any obstruction. Subsequent images captured by the image capture device as shown with respect to FIG. 3B will show the hand of the agent 213 reaching into the inventory location 106 to grasp an item 209. When the hand of the agent 213 is reaching into the inventory location 106, the area of pixels 206 (FIG. 2) associated with the inventory location 106 will change due to the obstruction presented by the hand or arm of the inventory location 213. In one embodiment, the image capture device 109 transmits the stream of images to the FC activity verification system 126.

The change in the area of pixels 206 within the view of the image capture device 109 as depicted in subsequent images provides an indication that the respective inventory location 106 was accessed. In one embodiment, the FC activity verification system 126 is configured to analyze the images and detect the access to a respective inventory location 106. In such case, the FC activity verification system 126 may be pre-configured with a table or other data structure that associates a given area of pixels 206 associated with a respective image capture device 109 with a given inventory location 106 or other structure in the environment 103. Once the FC activity verification system 126 determines that a given area of pixels 206 has experienced activity, the FC activity verification system 126 can automatically verify that such access is proper and generate an event associated with the access activity to trigger the implementation of proper action as the case may be.

As shown with respect to FIGS. 3A, 3B, and 3C, the hand of an agent 213 enters the inventory location 106, grasps an item 209, and removes the item from the inventory location 106. On a simple level, the access to the respective inventory location 106 may be detected due to the change in the area of pixels 206 by virtue of the fact that the hand of the agent 213 obstructs the view of inventory location 106. Alternatively, the access to the respective inventory location 106 may be detected by identifying a forward motion of the hand of an agent 213 toward and into the inventory location 106. Also, the reverse motion of the hand of the agent 213 as it leaves the inventory location 106 grasping an item 209 may be detected as depicted in FIG. 3C.

Still further, the FC activity verification system 126 may be configured to identify the number of pixels altered as the hand of the agent 213 enters the inventory location 106 and the number of pixels altered as the hand of the agent 213 is removed from the inventory location 106 to determine if an item is being added or removed from the inventory location 106. This determination can be made due to the fact that the item 209 will likely increase the number of altered pixels when either added to or removed from the inventory location 106.

The FC activity verification system 126 can identify when an agent accesses a given inventory location 106 using any of the above approaches. Once identified, the FC activity verification system 126 then attempts to verify that the access to the respective inventory location 106 is consistent with the predefined activity orchestration associated with the environment 103. Alternatively, where the image capture devices 109 include sufficient processing capabilities, the image capture devices 109 may be configured to detect access to inventory locations 106 in the same manner as described above. In such a case, upon detecting access to an inventory location 106, the image capture devices 109 may be configured to generate a message or event that is transmitted to the FC activity verification system 126 indicating the respective inventory location 106 that has been accessed. The FC activity verification system 126 may then proceed to verify whether the access to the respective inventory location 106 was consistent with the predefined activity orchestration of the environment 103.

Figure 4:
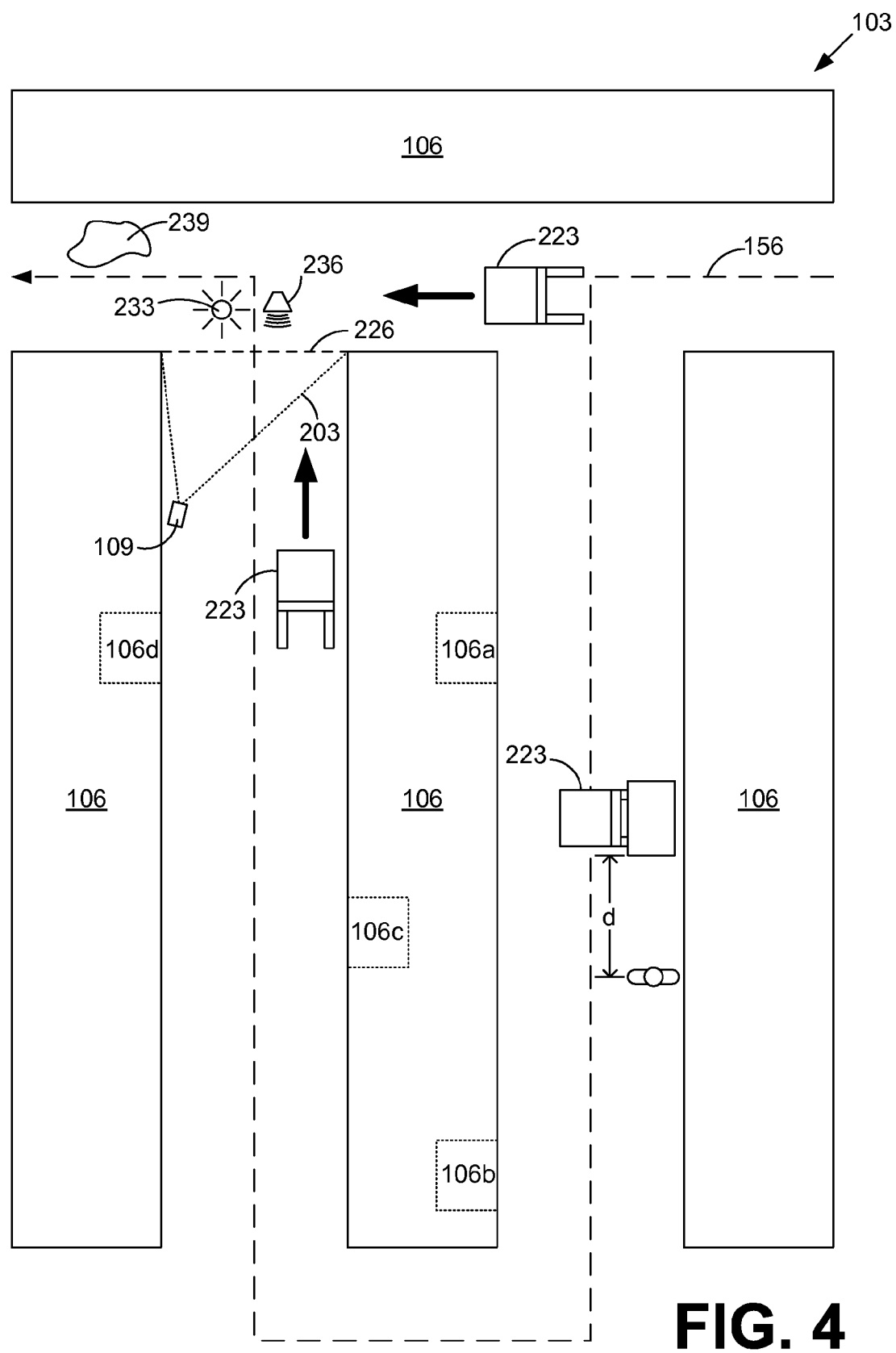
FIG. 4 is a drawing depicting one example of an overhead view of a portion of the environment illustrated in FIG. 1 according to an embodiment of the present invention.

With reference to FIG. 4, shown is one example of a portion of the environment 103 that illustrates various activities that may occur within the environment 103 according to various embodiments of the present invention. For example, the predefined activity orchestration of the environment 103 includes the pick routes 156 described above. With respect to FIG. 4, shown is one example of a pick route that illustrates the path taken by an agent in navigating through the various inventory locations 106 to collect items from respective inventory locations 106a, 106b, 106c, and 106d. The pick routes 156 are optimized so that the agents can traverse the shortest distance through the environment 103 and collect all of the items from the respective inventory locations 106 for a given order or group of orders in the shortest time possible.

In addition, various handling equipment may be employed within the environment 103 to move items as can be appreciated. For example, the handling equipment may include forklifts 223 or other equipment that may be used to move items or pallets of items for restocking or other purposes. Other devices that may be used include personnel moving devices such as a SEGWAY™ or other equipment that allows people to move through the environment 103 without the need to walk as can be appreciated.

Also, the environment 103 may include a plurality of checkpoints 226. Associated with the checkpoint 226 is a capture device 109 that includes the checkpoint 226 within its field of view 203. The checkpoint 226 is a point within the environment 103 at which all individuals who traverse through the checkpoint 226 are subject to detection and verification. The documentation of individuals may be accomplished, for example, by capturing an image of the individuals with image capture devices 109 suitably located near the checkpoint 226. Such image capture devices 109 are positioned so that their field of view 203 may facilitate the capture of an image of the faces or other biological features of the individuals passing through the checkpoint 226.

The image capture device 109 may then provide an image of a face of an individual that passed through the checkpoint 226 to the FC activity verification system 126. The FC activity verification system 126 interfaces with the face recognition system 146 to determine who the person is that crossed the checkpoint 226. This advantageously facilitates restricting access to various areas of the environment 103 to authorized personnel. Specifically, the FC activity verification system 126 may verify that a given individual was allowed to pass over the checkpoint 226 and into a given area of the environment 103 where access is restricted. To this end, the security system 186 may include lists of individuals who have access to various areas within the environment 103.

In an alternative embodiment, once the identity of an individual who crosses through a checkpoint 226 is known, then the FC activity verification system 126 can verify that such an individual had reason to pass through the checkpoint 226. For example, the FC activity verification system 126 may verify that the pick route 156 followed by the agent that crossed a checkpoint 226 actually passes through the checkpoint 226. This advantageously allows managers, for example, to verify that agents are following the pick routes 156 through the environment 103. This is advantageous because the pick routes 156 have been optimized so as to maximize efficiency by directing agents to traverse the shortest distance possible through the environment during picking of items.

It is understood that more than a single image capture device 109 may be associated with a given checkpoint 226 so as to be able to obtain images of faces of individuals passing through the checkpoint 226 from any possible direction. In addition, agents and other individuals may wear unique identification tags that are positioned such that they can be viewed by the image capture devices 109 to determine the identity of the agent or individual. Also, the image capture devices 109 may be moveable so that they can track the movement of individuals or equipment beyond the checkpoint 226.

In addition, image capture devices 109 may be strategically placed in a given area such as a restricted area of the environment 103 to determine the identity of individuals who enter any portion of the area beyond simply a checkpoint 226. For example, access to some areas of the environment 103 may be restricted to predefined personnel. To this end, the image capture devices 109 obtain images of the faces of individuals anywhere in the restricted area to verify that they have been authorized to enter the given area.

In addition, the environment 103 may include various alarm devices such as, for example, flashing lights 233, audible alarms 236, or other devices. The alarm devices 233/236 may be positioned at various locations throughout the entire environment 103 so that they can be triggered in response to a determination that a given activity captured by one of the image capture devices 109 is inconsistent with the predefined activity orchestration of the environment 103. As a result, the alarm devices 233/236 may be activated, for example, by the contemporaneous alarm system 183 (FIG. 1) so that the alarm occurs contemporaneous with the activity that was inconsistent with the predefined activity orchestration of the environment 103.

In this sense, the alarm is contemporaneous with the activity when it occurs within a short time period after the activity is captured by the image capture devices 109 such that the individual associated with the activity can take corrective action to ameliorate the negative effects of the activity at the time the activity occurs. This contrasts with having to employ additional workforce and resources to correct the negative outcomes of various activities well after the fact. To provide a specific example, assume an agent who is following a pick route 156 reaches into an inventory location 106 and removes an item. Upon detection of the activity, the FC activity verification system 126 can determine whether the given inventory location 106 was supposed to be accessed, for example, based on the pick routes 156.

Assuming it is determined that the agent made an error by accessing the wrong inventory location 106 an event may be generated that results in one of the alarms 233/236 being set off near the inventory location 106 accessed to inform the agent that the wrong item had been picked before the agent leaves the area. This allows the agent to return the picked item and identify the correct item from the correct inventory location 106 associated with the pick route 156. This ultimately translates into more efficient and accurate picking and greater customer satisfaction given that fewer mistakes are made in shipping products to customers.

In addition, based on images from respective image capture devices 109, the FC activity verification system 126 may detect a hazard within the environment 103, such as a spill 239 on the floor or other hazard. When a hazard is detected, the FC activity verification system 126 may be configured to generate an event that triggers the activation of an alarm near the hazard. Also, the event may further cause maintenance to be notified of the hazard so that it can be resolved quickly and prevent falls and injuries.

The illustration of the environment 103 also provides an opportunity to discuss examples of various rules 173 (FIG. 1) such as safety rules that are generated by the movement control system 153 that make up part of the predefined activity orchestration of the environment 103. Such rules may involve restricting access to various areas of the environment 103. For example, a rule 173 may restrict passage through a given checkpoint 223 to authorized personnel. Also, a rule 173 may restrict access to a predefined area in the environment 103 to authorized personnel.

The rules 173 may also relate to the movement or relative movement of entities in the environment 103. Such entities may comprise people, equipment, or objects in the environment 103. For example, the rules may relate to permissible relative movement of entities with in the environment 103. Such rules may dictate, for example, that no forklift 223 can be used to lift items within a distance D of any individual in the environment 103. The raising or lowering of a forklift 223 may be determined, for example, by detecting a change in focus of images of the raised or lowered portion of the forklift 223 relative to image capture devices 109 placed overhead or via some other approach. Also, the rules 173 may set forth speed limits to control the speed of the forklifts 223 or other equipment traversing through the environment 103 to reduce the possibility that individuals within the environment 103 are not hit or otherwise injured by moving equipment. In addition, where two forklifts 223 are moving toward each other, but are blinded by an obstruction such as the inventory locations 106 as depicted in FIG. 4, a rule 173 may be created that causes a given one of the alarms 233/236 to be activated to warn the operators that the potential for a collision exists.

A rule 173 might be created that results in an event that triggers an alarm based upon a condition on the ground of the environment 103 such as, for example, a spill 239 or other obstruction as can be appreciated. The rules 173 may also include rules relating to the proper operation of equipment associated with loading docks such as equipment that secures trucks to the docks before the contents of the trucks are accessed.

In addition, there may be many other rules 173 that regulate the activity that occurs within the environment 103 as can be appreciated.

Figure 5:
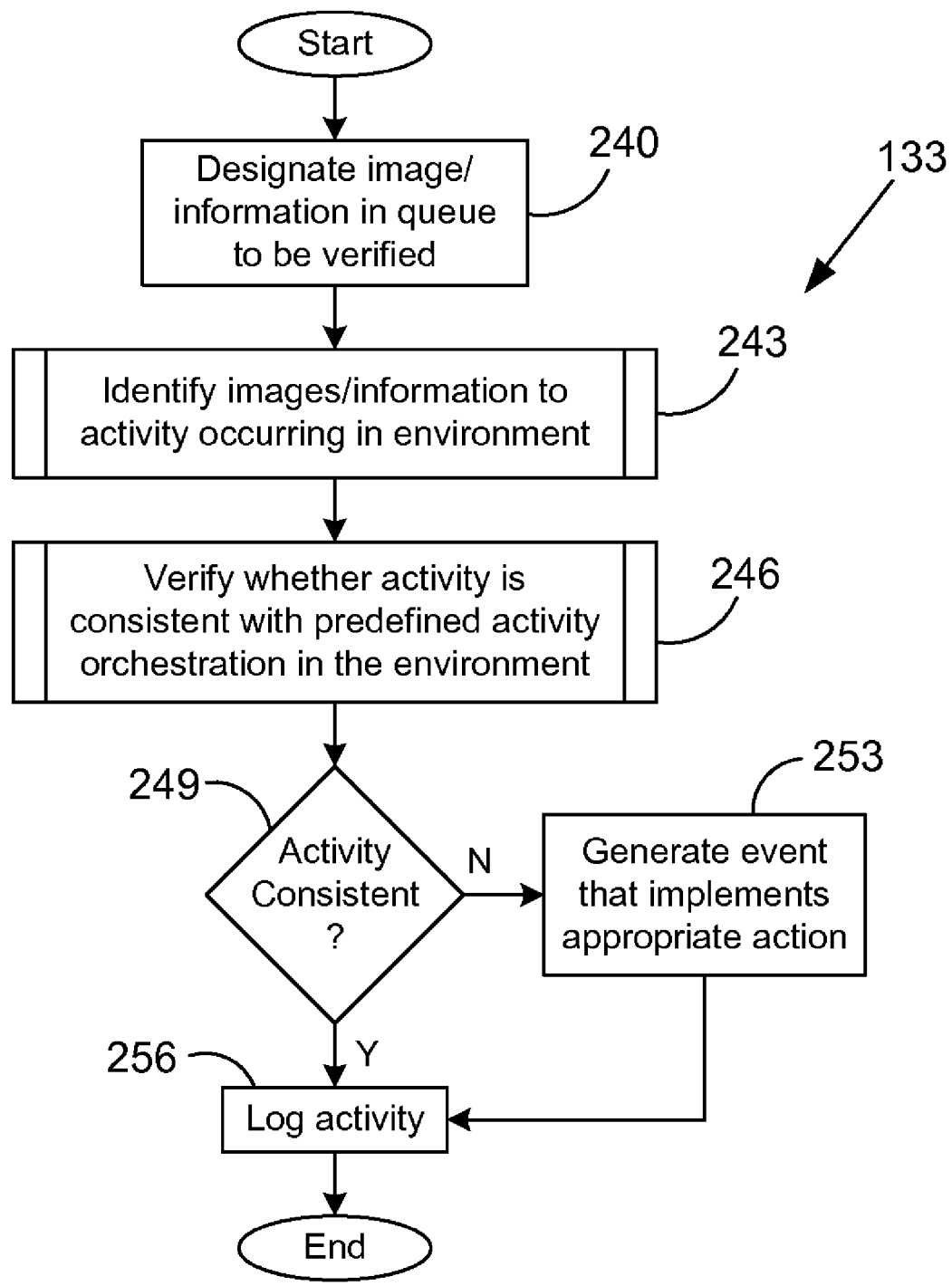
FIG. 5 is a flow chart that illustrates one example of the operation of the system to verify activity occurring in the environment of FIG. 1 according to an embodiment of the present invention.

Referring next to FIG. 5, shown is a flow chart that provides one broad example of the operation of the activity verification logic 133 of the FC activity verification system 126 according to an embodiment of the present invention. Alternatively, the flow chart of FIG. 5 may be viewed as depicting steps of an example of a method implemented in a server, computer system, or like device to verify that activity occurring within the environment 103 (FIG. 1) is consistent with the predefined activity orchestration of the environment 103. The functionality of the activity verification logic 133 as depicted by the example flow chart of FIG. 5 may be implemented, for example, in an object oriented design or in some other programming architecture. Assuming the functionality is implemented in an object oriented design, then each block represents functionality that may be implemented in one or more methods that are encapsulated in one or more objects. The activity verification logic 133 may be implemented using any one of a number of programming languages such as, for example, C, C++, or other programming languages.

Beginning with box 240, the activity verification logic 133 designates an activity in an activity queue 129 to be verified. The activity queue 129 may include, for example, images or messages from the image capture devices 109 that show or describe activity occurring within the environment 103. To this end, the activity queue 129 may represent a plurality of queues or other storage locations where images or messages are temporarily stored for consideration by the activity verification logic 133.

Based upon the physical inputs to which the image capture devices 109 are connected, the activity verification logic 133 may be preprogrammed to know the purpose of each image capture device 109 and its location in the environment 103. For example, where an image capture device 109 is used to obtain images of individuals as they pass through a checkpoint 226, then the images captured by a respective image capture device 109 coupled to a predefined input port may be stored in a specific memory location associated with the checkpoint 226. The activity verification logic 133 knows that such images are of agents passing through the respective checkpoint 226 based upon where the images are temporarily stored to be accessed by the activity verification logic 133.

Once the activity is designated in an activity queue 129 in box 240, the activity verification logic 133 proceeds to box 243 in which images or other information is analyzed or otherwise processed to identify activity occurring in the environment 103 that is to be verified as consistent with the predefined activity orchestration of the environment 103. For example, the images may depict an agent accessing an inventory location 106. As such, the activity verification logic 133 is configured to detect the access to the respective inventory location 106 as described above. Alternatively, the image may depict an agent traversing through a checkpoint 226. The activity verification logic 133 may then forward the image of the agent to the face recognition system 146 to determine the identity of the agent. Alternatively, where the image capture devices 109 include sufficient processing capability, this step may be performed in the image capture devices 109. As such, the activity verification logic 133 may receive appropriate messages describing activity occurring in the environment 103 from the image capture devices 109. Such messages may be stored in the queue(s) 129 to be accessed by the activity verification logic 133.

Then, in box 246, the activity verification logic 133 proceeds to verify that the activity is consistent with the predefined activity orchestration of the environment 103. As set forth above, the activities may include accessing the inventory locations 106 in order to obtain items therefrom, or to restock items into the inventory locations 106. The activities may further include the movement of agents along pick routes 156 (FIG. 1) and the movement of individuals in the environment 103 through various checkpoints or into restricted areas as described above. The activities may also involve the operation of equipment, or the relative movement of equipment and individuals with respect to each other. Also, the activities to verify may include other activities as described above or consistent with the operation within the environment 103 as can be appreciated.

In determining whether the activities are consistent with the predefined activity orchestration of the environment 103, the activity verification logic 133 may consult pick routes 156, rules 173, or other information as described above. For example, the activity verification logic 133 may determine that an agent that passed through a given checkpoint 226 was or was not following a pathway associated with an assigned pick route 156. The activity verification logic 133 may also interface with an inventory control system 149 that provides for inventory control in the environment 103 to determine whether inventory locations 106 and items accessed were properly scanned, etc. In addition, the activity verification logic 133 may consult other predefined information that is maintained in association with the environment 103.

Thereafter, in box 249, if the activity is inconsistent with the predefined activity orchestration of the environment 103, then the activity verification logic 133 proceeds to box 253. Otherwise, the activity verification logic 133 proceeds to box 256.

In box 253, the activity verification logic 133 generates an event that describes the inconsistency between the respective activity and the predefined activity orchestration of the environment 103. The event may be applied to a respective system such as the contemporaneous alarm system 183, FC security system 186, the human resources management system 189, the manual review system 193, or other system that implements an action in response thereto. For example, the action taken may be a corrective action to ameliorate a negative consequence associated with the activity described by the event. For example, if an agent were to pull an item from the wrong inventory location 106 in fulfilling an order, the action may comprise an alarm such as an audible or visual alarm that is triggered in the area of the picker contemporaneously with the access to the inventory location 106 to inform the picker that it is possible that they obtained the wrong item for the respective order.

Accordingly, the agent can evaluate whether the wrong item was pulled, replace the item in the respective inventory location 106 if such was the case, and pick the correct item from the correct inventory location 106. Also, if an individual places items in the wrong inventory location 106 in a manner inconsistent with a predefined stocking order that requires items be placed in certain inventory locations 106, an alarm may be triggered contemporaneously with the stocking activity in the area of the individual to inform them that they have misplaced items. This advantageously prevents the negative consequence of such items being lost, thereby resulting in unwanted inventory shrinkage.

Events may trigger still other actions such as, for example, causing the security system 186 to alert security personnel of a potential theft of an item from an inventory location 106 that was accessed without authorization. Also, where it appears that an individual agent is not following an assigned pick route 156 by virtue of the checkpoints 226 that the agent passes through, the activity verification logic 133 may generate an event that causes the human resources management system 189 to inform a manager of the activity so that the manager can address the noncompliance with the routes on the part of the individual employee to ensure maximum efficiency.

In addition, if the activity verification logic 133 is unable to verify the activity, then the activity verification logic 133 may generate an event that causes the manual review system 193 to store and present the images to personnel for manual review to determine consistency with the predefined activity orchestration of the environment 103. This might occur, for example, where the activity verification logic 133 made an error in identifying the activity in box 243. As such, the activity identified might not actually have occurred or may be inaccurately identified, etc. Alternatively, it may be the case that a properly identified activity could not be verified for some reason.

Once an event has been generated that triggers appropriate action in response to the inconsistency between the activity and the predefined activity orchestration of the environment 103 in box 253, then the activity verification logic 133 proceeds to box 256 in which the activity may be logged for future reference. This may comprise, for example, storing an event that may comprise a message and/or an image of an activity in a data store for long term storage and retrieval as can be appreciated. Thereafter, the activity verification logic 133 ends as shown.

Assuming that the activity is consistent with the predefined activity orchestration of the environment 103 as determined in box 249, then the activity verification logic 133 proceeds directly to box 256 in which the activity may be logged for future reference. The logging for long term storage of the activities in box 256 provides an advantage in that it provides a record of the activities of employees within the environment 103 that may be employed for purposes of rewarding employees or to develop a track record of desired behavior. Also, where a given employee repeatedly engages in behavior that is inconsistent with the predefined activity orchestration or harmful in some other manner, then the logged activities that are maintained in a data store for a long period of time can provide documentation of the behavior for purposes of substantiating reasons for dismissal that can be used in unemployment proceedings if necessary.

Figure 6:
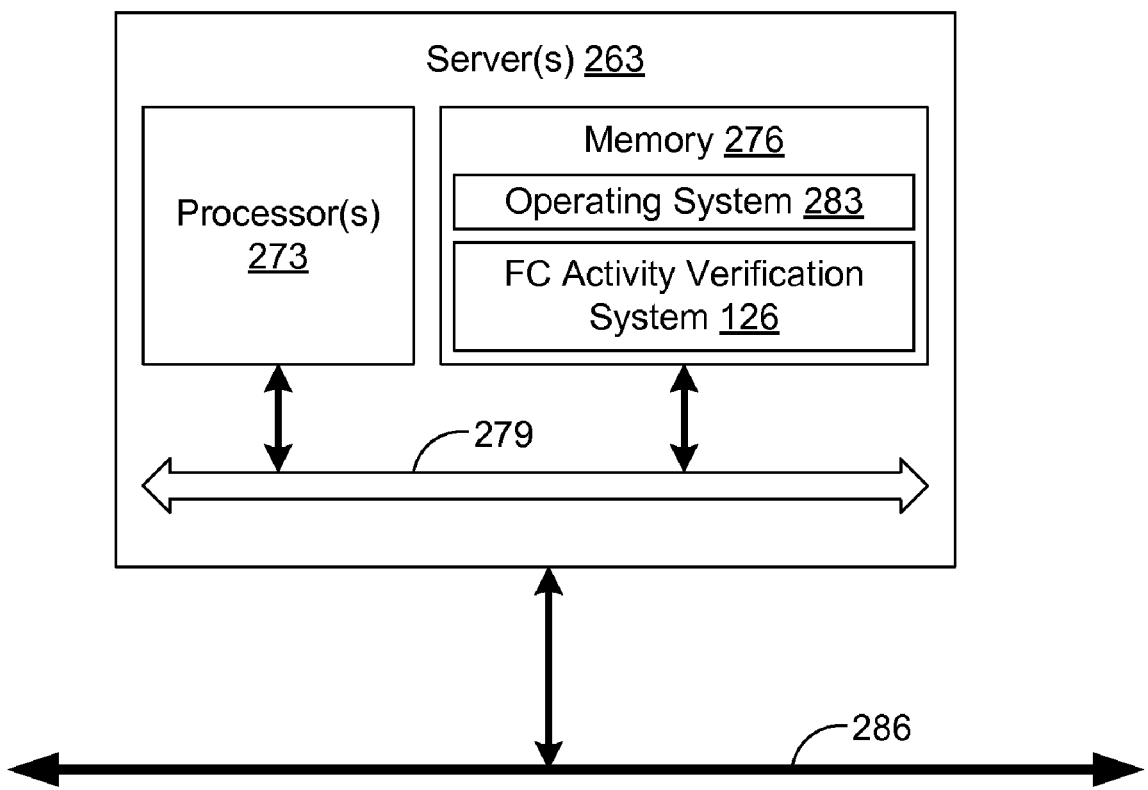
FIG. 6 is a schematic block diagram of one example embodiment of the system to verify activity occurring in the environment of FIG. 1 according to an embodiment of the present invention.

With reference to FIG. 6, shown is one example of a server 263 that may be employed to implement the FC activity verification system 126 according to an embodiment of the present invention. The server 263 may be representative of multiple servers as can be appreciated. The server 263 includes one or more processors 273 and one or more memories 276, each of which is coupled to a local interface 279. The local interface 279 may comprise, for example, a data bus with an accompanying control/address bus as can be appreciated. In this respect, the server 263 may comprise a processor circuit as is typical for servers and computer systems as can be appreciated.

Stored in the memory 276 and executable by the one or more processors 273 is an operating system 283 and the FC activity verification system 126. In this respect, the FC activity verification system 126 is embodied in software that is executable by the processor circuit as can be appreciated.

The server 263 may be coupled to a network 286 that facilitates communication with other servers or other devices as can be appreciated. The local area network may comprise, for example, an intranet, a local area network, a wide area network, a wireless network, or other appropriate network, etc., or any combination of two or more such networks.

The FC activity verification system 126 is depicted as being stored in the memory 276 and executable by the processor 273. In this respect, the term "executable" means a program file that is in a form that can ultimately be run by the processor 273. Examples of executable programs may be, for example, a compiled program that can be translated into machine code in a format that can be loaded into a random access portion of the memory 276 and run by the processor 273, or source code that may be expressed in proper format such as object code that is capable of being loaded into a of random access portion of the memory 276 and executed by the processor 273, etc. An executable program may be stored in any portion or component of the memory 276 including, for example, random access memory, read-only memory, a hard drive, compact disk (CD), floppy disk, or other memory components.

Also, the memory 276 is defined herein as both volatile and nonvolatile memory and data storage components. Volatile components are those that do not retain data values upon loss of power. Nonvolatile components are those that retain data upon a loss of power. Thus, the memory 276 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In addition, the processor 273 may represent multiple processors and the memory 276 may represent multiple memories that operate in parallel. In such a case, the local interface 279 may be an appropriate network that facilitates communication between any two of the multiple processors, between any processor and any one of the memories, or between any two of the memories etc. The processor 273 may be of electrical, optical, or of some other construction as can be appreciated by those with ordinary skill in the art.

The operating system 283 is executed to control the allocation and usage of hardware resources such as the memory, processing time and peripheral devices in the server(s) 263. In this manner, the operating system 276 serves as the foundation on which applications depend as is generally known by those with ordinary skill in the art.

Although the FC activity verification system 126 is embodied in software or code executed by general purpose hardware as discussed above, as an alternative the same may also be embodied in dedicated hardware or a combination of software/general purpose hardware and dedicated hardware. If embodied in dedicated hardware, the FC activity verification system 126 can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

The flow chart of FIG. 5 shows the functionality or operation of one example implementation of the activity verification logic 133. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flow chart of FIG. 5 shows a specific order of execution, it is understood that the order of execution may differ from that which is depicted. For example, the order of execution of two or more blocks may be scrambled relative to the order shown. Also, two or more blocks shown in succession in FIG. 5 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present invention.

Also, where the FC activity verification system 126 comprises software or code, it can be embodied in any computer-readable medium for use by or in connection with an instruction execution system such as, for example, a processor in a computer system or other system. In this sense, the system may comprise, for example, statements including instructions and declarations that can be fetched from the computer-readable medium and executed by the instruction execution system. In the context of the present invention, a "computer-readable medium" can be any medium that can contain, store, or maintain the logic associated with the FC activity verification system 126 for use by or in connection with the instruction execution system. The computer readable medium can comprise any one of many physical media such as, for example, electronic, magnetic, optical, electromagnetic, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present invention are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Therefore, having thus described the invention, at least the following is claimed:

1. A system, comprising:
   at least one processor circuit having a processor and a memory; and
   logic executable by the at least one processor circuit that:
      verifies whether an activity detected in at least one image captured by an image capture device in an environment of predefined activity orchestration is consistent with the predefined activity orchestration; and
      generates an event based upon the activity and the predefined activity orchestration;
      wherein the environment includes a plurality of inventory locations, wherein an inventory of items is stored in the inventory locations; and
      wherein the predefined activity orchestration further comprises a plurality of pick routes, each of the pick routes listing at least one item to be obtained from a corresponding at least one inventory location in the environment.

2. The system of claim 1, wherein the event indicates whether the activity is inconsistent with the predefined activity orchestration, the event triggering an action.

3. The system of claim 1, wherein the environment further comprises a fulfillment center where a plurality of orders for a plurality of items are fulfilled and shipped to a plurality of customers.

4. The system of claim 1, wherein the activity further comprises an access to an inventory location in the environment.

5. The system of claim 4, wherein the activity further comprises taking an item from the inventory location.

6. The system of claim 4, wherein the activity further comprises adding an item to the inventory location.

7. The system of claim 1, wherein each of the pick routes set forth a route for an agent to follow through the environment.

8. The system of claim 1, wherein the activity further comprises an individual passing through a checkpoint in the environment.

9. The system of claim 8, wherein the image capture device captures an image of a face of the individual passing through the checkpoint.

10. The system of claim 1, wherein the predefined activity orchestration further comprises a rule that restricts traversal of a checkpoint to authorized personnel.

11. The system of claim 1, wherein the predefined activity orchestration further comprises a rule that restricts access to a predefined area in the environment to authorized personnel.

12. The system of claim 1, wherein the predefined activity orchestration further comprises at least one rule relating to an operation of equipment in the environment.

13. The system of claim 2, wherein the action further comprises a corrective action to ameliorate a negative consequence associated with the activity.

14. The system of claim 13, wherein the corrective action further comprises sending a message to an individual associated with the activity.

15. The system of claim 13, wherein the corrective action further comprises activating an alarm indicating that corrective action needs to be taken with respect to the activity.

16. The system of claim 13, wherein the corrective action is implemented contemporaneously with an occurrence of the activity.

17. The system of claim 2, wherein the action further comprises storing a record of the activity captured on the image capture device for a manual review.

18. A system, comprising:
   means for optically capturing at least one image in an environment of predefined activity orchestration;
   means for verifying whether an activity detected in the at least one image is consistent with the predefined activity orchestration; and
   means for automatically generating an event based upon the activity and the predefined activity orchestration;
   wherein the environment includes a plurality of inventory locations, wherein an inventory of items is stored in the inventory locations; and
   wherein the predefined activity orchestration further comprises a plurality of pick routes, each of the pick routes listing at least one item to be obtained from a corresponding at least one inventory location in the environment.

19. The system of claim 18, wherein the event indicates whether the activity is inconsistent with the predefined activity orchestration.

20. The system of claim 18, wherein the environment further comprises a fulfillment center where a plurality of orders for a plurality of items are fulfilled and shipped to a plurality of customers, and the activity comprises accessing the inventory locations.

21. The system of claim 18, wherein each of the pick routes list at least one item to be obtained from a corresponding at least one inventory locations in the environment.

22. The system of claim 18, wherein the activity further comprises an individual passing through a checkpoint in the environment.

23. The system of claim 19, further comprising means for sending a message to an individual associated with the activity based on the event.

24. The system of claim 19, further comprising means for activating an alarm based on the event, the alarm indicating that corrective action needs to be taken with respect to the activity.

25. The system of claim 19, further comprising means for implementing an action based upon the event, the action being implemented contemporaneously with an occurrence of the activity.

26. A program embodied in a computer readable medium and executable by a processor-based system, comprising:
   code that verifies whether an activity detected in at least one image captured by an image capture device in an environment of predefined activity orchestration is consistent with the predefined activity orchestration; and
   code that automatically generates an event based upon the activity and the predefined activity orchestration;
   wherein the environment includes a plurality of inventory locations, wherein an inventory of items is stored in the inventory locations; and
   wherein the predefined activity orchestration further comprises a plurality of pick routes, each of the pick routes listing at least one item to be obtained from a corresponding at least one inventory location in the environment.

27. The program embodied in the computer readable medium and executable by the processor-based system of claim 26, wherein the event indicates whether the activity is inconsistent with the predefined activity orchestration.

28. The program embodied in the computer readable medium and executable by the processor-based system of claim 26, wherein the environment further comprises a fulfillment center where a plurality of orders for a plurality of items are fulfilled and shipped to a plurality of customers.

29. The program embodied in the computer readable medium and executable by the processor-based system of claim 28, wherein the activity further comprises an access to an inventory location in the environment.

30. The program embodied in the computer readable medium and executable by the processor-based system of claim 27, wherein the event triggers an implementation of an action to ameliorate a negative consequence associated with the activity.

31. The program embodied in the computer readable medium and executable by the processor-based system of claim 30, wherein the action further comprises sending a message to an individual associated with the activity.

32. The program embodied in the computer readable medium and executable by the processor-based system of claim 30, wherein the action further comprises activating an alarm indicating that corrective action needs to be taken with respect to the activity.

33. The program embodied in the computer readable medium and executable by the processor-based system of claim 30, wherein the action is implemented contemporaneously with an occurrence of the activity.

34. The system of claim 1, further comprising data accessible by the at least one processor circuit that describes the predefined activity orchestration of the environment.

35. The system of claim 34, wherein each of the pick routes set forth a route for an agent to follow through the environment.

36. The system of claim 34, wherein the data describing the predefined activity orchestration further describes a rule that restricts traversal of a checkpoint to authorized personnel.

37. The system of claim 34, wherein the data describing the predefined activity orchestration further describes a rule that restricts access to a predefined area in the environment to authorized personnel.

* * * * *